(12) United States Patent
Ge et al.

(10) Patent No.: US 11,607,968 B1
(45) Date of Patent: Mar. 21, 2023

(54) INTEGRATED TRACTION BATTERY POWER SYSTEM FOR ELECTRIC VEHICLE APPLICATIONS

(71) Applicant: Ford Global Technologies, LLC, Dearborn, MI (US)

(72) Inventors: Baoming Ge, Okemos, MI (US); Yantao Song, Northville, MI (US); Lihua Chen, Farmington Hills, MI (US); Serdar Hakki Yonak, Ann Arbor, MI (US); Boris Curuvija, West Bloomfield, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/720,767

(22) Filed: Apr. 14, 2022

(51) Int. Cl.
| | |
|---|---|
| *G06F 13/374* | (2006.01) |
| *B60L 53/24* | (2019.01) |
| *H02J 7/02* | (2016.01) |
| *H02J 3/32* | (2006.01) |
| *H02M 7/219* | (2006.01) |
| *H02M 7/5387* | (2007.01) |
| *H02M 3/335* | (2006.01) |
| *H02P 27/08* | (2006.01) |
| *B60L 50/60* | (2019.01) |

(52) U.S. Cl.
CPC ............. *B60L 53/24* (2019.02); *B60L 50/60* (2019.02); *H02J 3/322* (2020.01); *H02J 7/02* (2013.01); *H02M 3/33573* (2021.05); *H02M 3/33576* (2013.01); *H02M 7/219* (2013.01); *H02M 7/53871* (2013.01); *H02P 27/08* (2013.01); *B60L 2210/30* (2013.01); *B60L 2210/40* (2013.01); *H02J 2207/20* (2020.01)

(58) Field of Classification Search
CPC . B60L 53/24; B60L 50/60; H02J 3/322; H02J 7/02; H02M 3/33573; H02M 3/33576; H02M 7/219; H02M 7/53871; H02P 27/08
See application file for complete search history.

(56) References Cited

U.S. PATENT DOCUMENTS

| | | | | |
|---|---|---|---|---|
| 3,950,691 | A * | 4/1976 | Ohba | H02M 7/53806 |
| | | | | 361/91.6 |
| 6,737,756 | B1 * | 5/2004 | Gale | B60L 58/21 |
| | | | | 307/45 |
| 6,930,404 | B1 | 8/2005 | Gale et al. | |
| 7,719,138 | B2 * | 5/2010 | Gallegos-Lopez | B60L 58/20 |
| | | | | 307/64 |
| 2009/0168461 | A1 * | 7/2009 | Nakahori | H02M 3/3378 |
| | | | | 363/17 |
| 2021/0191892 | A1 * | 6/2021 | Yu | H02J 3/0073 |
| 2022/0161673 | A1 * | 5/2022 | Jimenez Pino | H02M 1/0009 |

FOREIGN PATENT DOCUMENTS

DE     102010001243 A1     7/2011

* cited by examiner

Primary Examiner — Jared Fureman
Assistant Examiner — Esayas G Yeshaw
(74) Attorney, Agent, or Firm — David B. Kelley; Brooks Kushman P.C.

(57) ABSTRACT

A vehicle power system has a DC to AC converter, a pair of AC to DC converters, a transformer including a core, a primary winding wound about the core and electrically connected to an output of the DC to AC converter, and a pair of secondary windings wound about the core, a traction battery electrically connected to a collective output of the AC to DC converters, and a controller.

20 Claims, 10 Drawing Sheets

INTEGRATED TRACTION BATTERY POWER SYSTEM FOR ELECTRIC VEHICLE APPLICATIONS

TECHNICAL FIELD

This disclosure relates to vehicle power systems and the control thereof.

BACKGROUND

Certain vehicles may be powered by electric machines that convert electrical energy to mechanical energy.

SUMMARY

A vehicle power system has a DC to AC converter, a pair of AC to DC converters, and a transformer including a core, a primary winding wound about the core and electrically connected to an output of the DC to AC converter, and a pair of secondary windings wound about the core. Each of the secondary windings is electrically connected to an input of one of the AC to DC converters. The system also has a controller that operates in a charge mode such that a magnitude of voltage at an input of the DC to AC converter is half of a magnitude of voltage at a collective output of the AC to DC converters to transfer power from the input of the DC to AC converter to the collective output. Voltages of capacitors of the AC to DC converters are balanced.

A vehicle has a DC to AC converter, a pair of AC to DC converters, and a transformer including a core, a primary winding wound about the core and electrically connected to an output of the DC to AC converter, and a pair of secondary windings wound about the core. Each of the secondary windings is electrically connected to an input of one of the AC to DC converters. The vehicle also has a traction battery electrically connected to a collective output of the AC to DC converters, a motor drive electrically connected to the collective output such that the traction battery is electrically between the collective output and the motor drive, and a controller. The controller operates in a drive mode such that switches of one of the AC to DC converters activate with a duty cycle, and switches of the other of the AC to DC converters and DC to AC converter are off to transfer power from the traction battery to the motor drive or vehicle loads.

A vehicle power system has a DC to AC converter, a pair of AC to DC converters, and a transformer including a core, a primary winding wound about the core and electrically connected to an output of the DC to AC converter, and a pair of secondary windings wound about the core. Each of the secondary windings is electrically connected to an input of one of the AC to DC converters. The system also has a traction battery electrically connected to a collective output of the AC to DC converters, and a controller that operates in a grid power/on-board generator mode such that switches of at least one of the AC to DC converters activate with a duty cycle and switches of the DC to AC converter remain off to transfer power from the traction battery to the input of the DC to AC converter.

DETAILED DESCRIPTION

Embodiments are described herein. It is to be understood, however, that the disclosed embodiments are merely examples and other embodiments may take various and alternative forms. The figures are not necessarily to scale. Some features could be exaggerated or minimized to show details of particular components. Therefore, specific structural and functional details disclosed herein are not to be interpreted as limiting, but merely as a representative basis for teaching one skilled in the art.

Various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
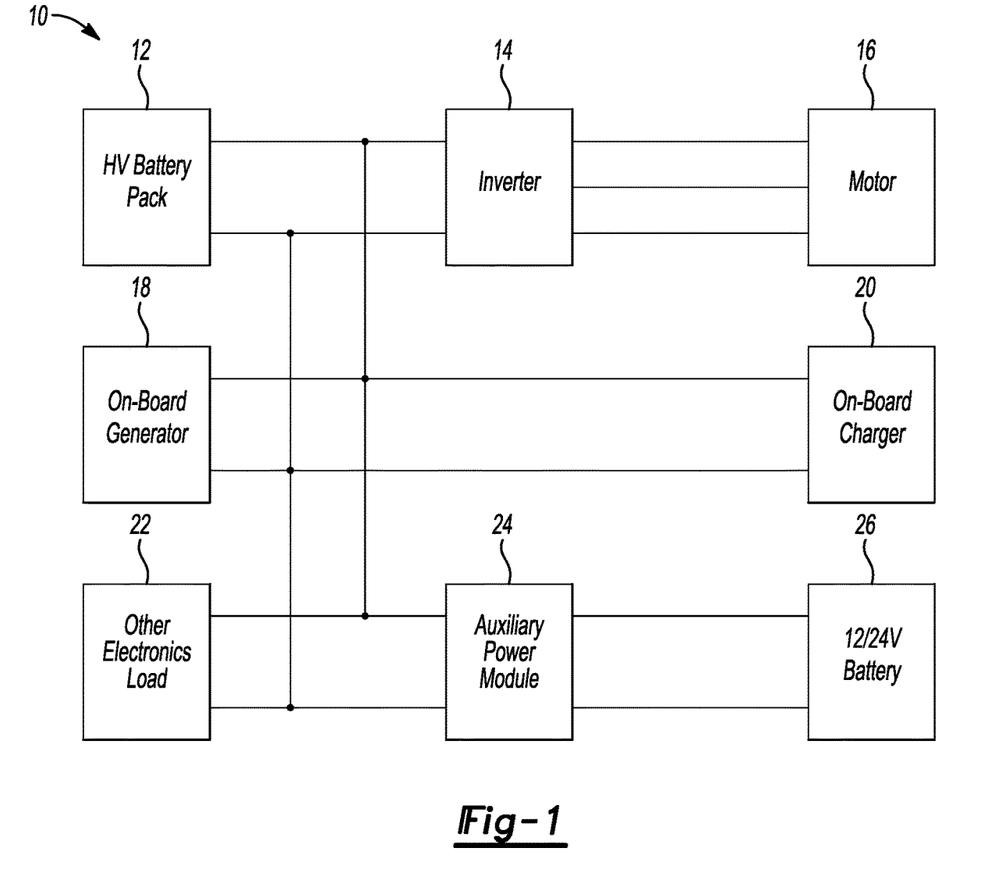
FIG. 1 is a block diagram of a typical high voltage power system of an electric vehicle.

FIG. 1 shows a typical high voltage power system 10 for a battery-based electric vehicle (BEV). The power system 10 includes a high voltage (HV) battery pack 12, an inverter 14, a motor 16, an on-board generator (OBG) 18, an on-board charger (OBC) 20, other electronic loads 22, an auxiliary power module (APM) 24, and an auxiliary battery 26. The HV battery pack 12 provides energy to drive the vehicle through the inverter 14 and traction motor 16. The OBG 18 converts DC electricity into AC power for customers. The OBC 20 performs HV battery charging. The APM 24 provides charging for the auxiliary battery 26. The other electronic loads 22, such as electric air conditioning, share a common HV DC bus having a voltage typically around 400V DC.

Increasing DC bus voltage is a trend to enhance power capability of traction inverters and motors. Recently, 800V DC bus-based electric drive systems are a topic of interest. When a high DC bus voltage is designed, the existing OBC 20, OBG 18, APM 24, and other electronic loads 22 may no longer be applicable because they are rated for a lower voltage (e.g., 400V). They should be re-designed to fit a higher DC bus voltage, which may result in more expense and development time.

In addition, for a 400V system, the converters such as the OBC 20 and APM 24 use switches (e.g., MOSFETs) with a voltage rating that is less than 650V to increase switching frequency, reduce converter size, and optimize performance. If the DC bus voltage is 800V however, 1200V power devices should be selected. It may be challenging to select MOSFETs of voltage rating over 650V because of limited choice, higher expense, and lower performance, such as high voltage drops, high reverse recovery losses, high leakage currents, and low switching speeds.

Figure 2:
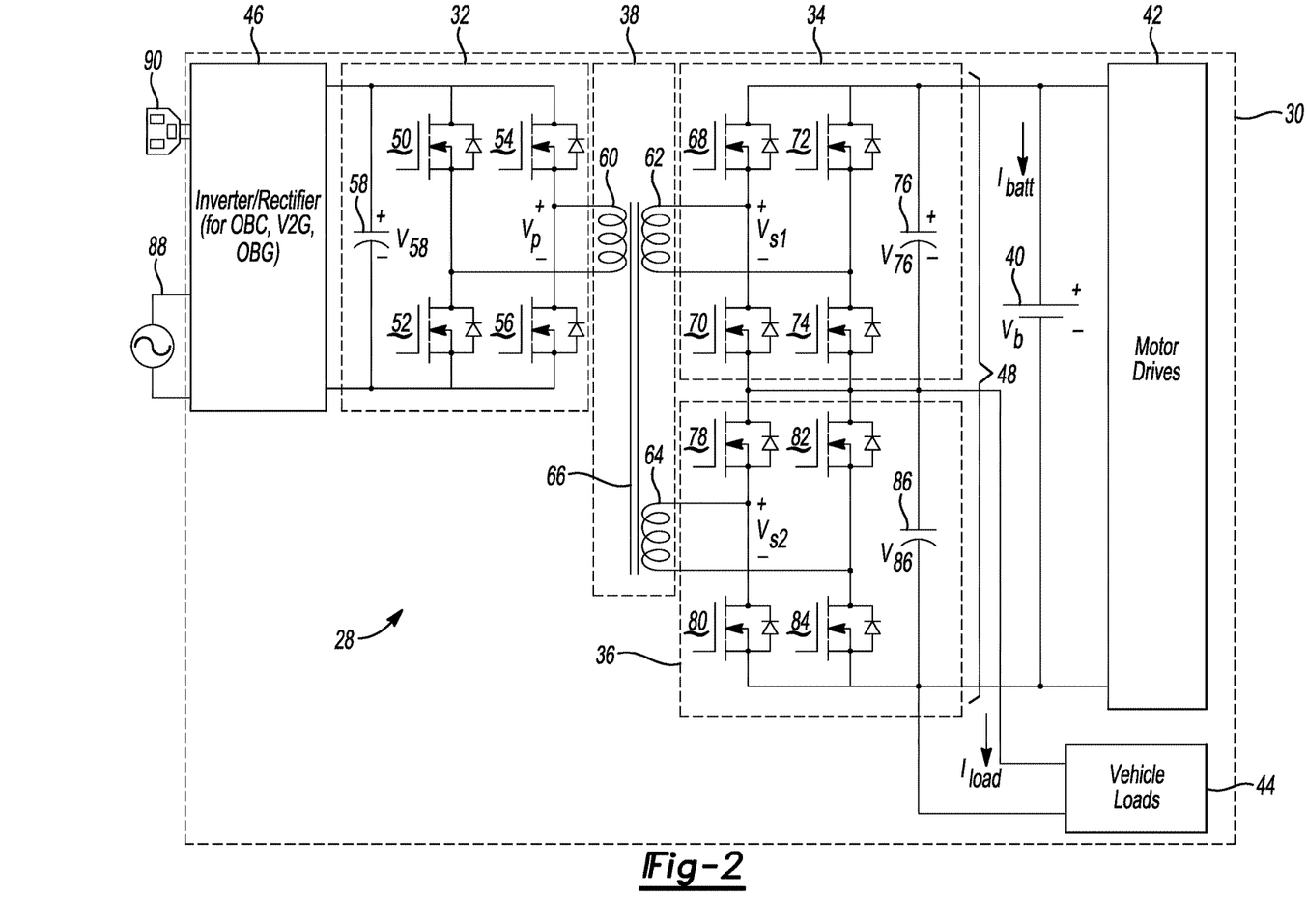
FIGS. 2 and 3 are block diagrams of vehicle power systems.

Here, an integrated high voltage (e.g., 800V) traction battery power system for electric vehicle applications is proposed to overcome the issues above. FIG. 2 shows one such example. Power system 28 for vehicle 30 includes a DC to AC converter 32, AC to DC converters 34, 36, transformer 38, traction battery 40, motor drives 42, vehicle loads 44, and inverter/rectifier 46. The inverter/rectifier 46 is electrically connected to an input of the DC to AC converter 32. The transformer 38 is electrically connected between the DC to AC converter 32 and AC to DC converters 34, 36. The AC to DC converters 34, 36 collectively define an output 48. The traction battery 40 is electrically connected to the output 48. The motor drives 42 are electrically connected to the traction battery 40 such that the traction battery 40 is electrically between the AC to DC converters 34, 36 and the motor drives 42.

The DC to AC converter 32 includes switches 50, 52, 54, 56 (e.g., MOSFETs) arranged in a typical H-bridge configuration and capacitor 58. The transformer 38 includes a primary winding 60, secondary windings 62, 64, and a core 66. The AC to DC converter 34 includes switches 68, 70, 72, 74 (e.g., MOSFETs) arranged in a typical H-bridge configuration and capacitor 76. The AC to DC converter 34 includes switches 78, 80, 82, 84 (e.g., MOSFETs) arranged in a typical H-bridge configuration and capacitor 86.

The capacitor 58 is electrically connected across the input of the DC to AC converter 32. The primary winding 60 is wound around the core 66 and electrically connected to the output of the DC to AC converter 32. The secondary windings 62, 64 are wound around the core 66 and are respectively electrically connected to the inputs of the AC to DC converters 34, 36. The capacitor 76 is electrically connected across the output of AC to DC converter 34. The capacitor 86 is electrically connected across the output of the AC to DC converter 36. The vehicle loads 44 are also electrically connected to the output of the AC to DC converter 36.

In this arrangement, when voltage Vb of the traction battery is 800V, the capacitors 58, 76, 86 have voltages of 400V, so the voltage stresses of the switches 50-56, 68-74, 78-84 and capacitors 58, 76, 86 are 400V. 600V MOSFETs can thus be used for the switches 50-56, 68-74, 78-84. With high switching frequency, the (high frequency) transformer 38 can have relatively small size.

A utility grid 88 and plug 90 are shown being electrically connected with the inverter 46. Other arrangements, however, are also possible.

Figure 3:
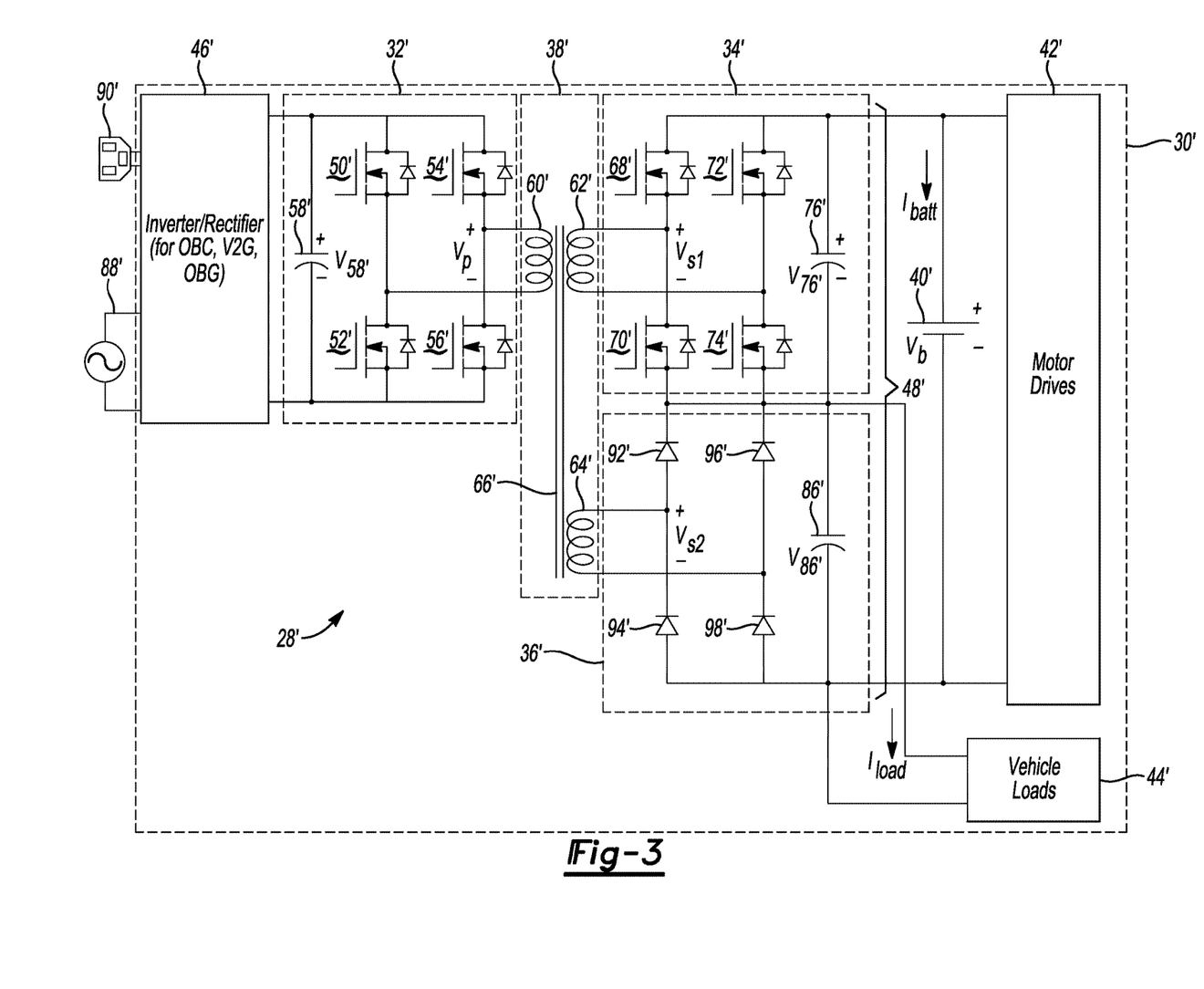

The circuitry of FIG. 2 can be simplified as shown in FIG. 3 if vehicle to grid functionality and on-board generator functionality are not required or the power of the vehicle to grid functionality and on-board generator functionality are not greater than the power of the vehicle loads 44. As a result, four switches are saved.

Power system 28' for vehicle 30' includes a DC to AC converter 32', AC to DC converters 34', 36', transformer 38', traction battery 40', motor drives 42', vehicle loads 44', and inverter/rectifier 46'. The inverter/rectifier 46' is electrically connected to an input of the DC to AC converter 32'. The transformer 38' is electrically connected between the DC to AC converter 32' and AC to DC converters 34', 36'. The AC to DC converters 34', 36' collectively define an output 48'. The traction battery 40' is electrically connected to the output 48'. The motor drives 42' are electrically connected to the traction battery 40' such that the traction battery 40' is electrically between the AC to DC converters 34', 36' and the motor drives 42'.

The DC to AC converter 32' includes switches 50', 52', 54', 56' (e.g., MOSFETs) arranged in a typical H-bridge configuration and capacitor 58'. The transformer 38' includes a primary winding 60', secondary windings 62', 64', and a core 66'. The AC to DC converter 34' includes switches 68', 70', 72', 74' (e.g., MOSFETs) arranged in a typical H-bridge configuration and capacitor 76'. The AC to DC converter 36' includes diodes 92', 94', 96', 98' arranged in a typical H-bridge configuration and capacitor 86'.

A utility grid 88' and plug 90' are shown being electrically connected with the inverter 46'. Other arrangements, however, are also possible as mentioned above.

Figure 4:
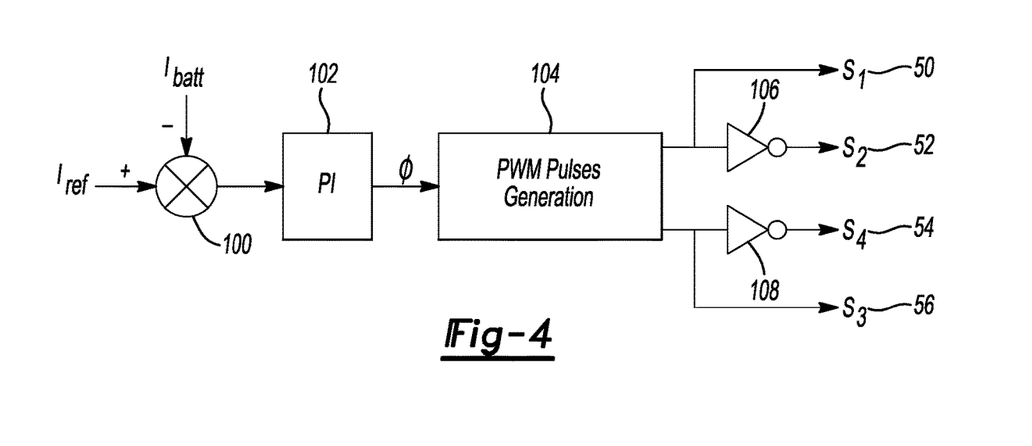
FIG. 4 is a control flow diagram.
Figure 5A:
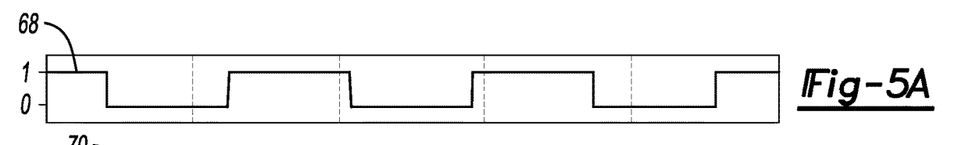
FIGS. 5A-5D and 6A-6D show switching schemes for various control modes.
Figure 5B:
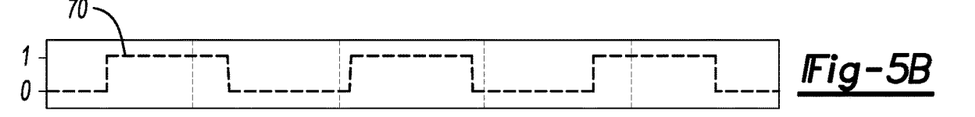
Figure 5C:
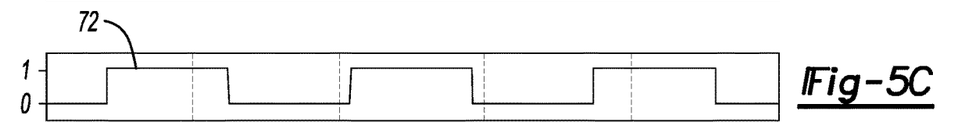
Figure 5D:
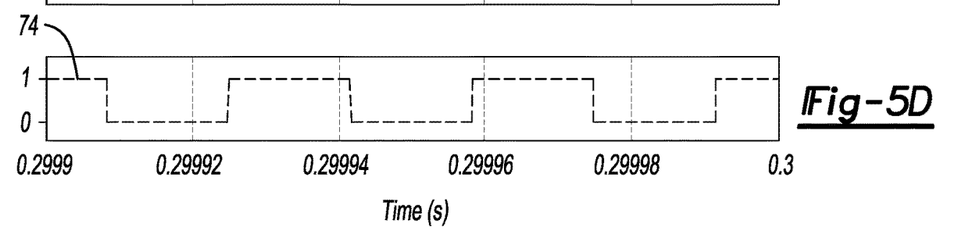
Figure 6A:
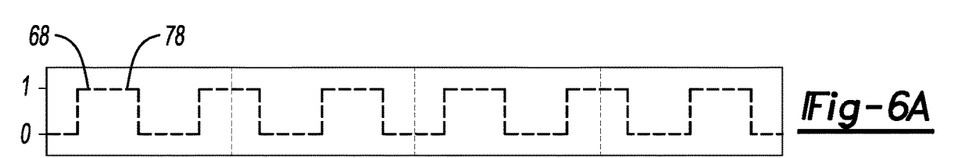
Figure 6B:
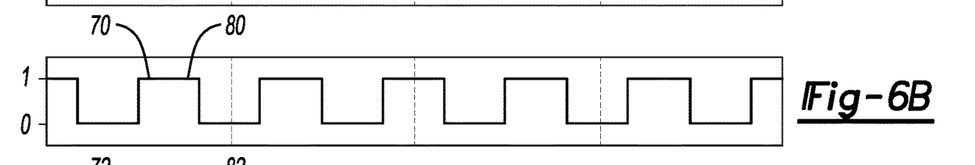
Figure 6C:
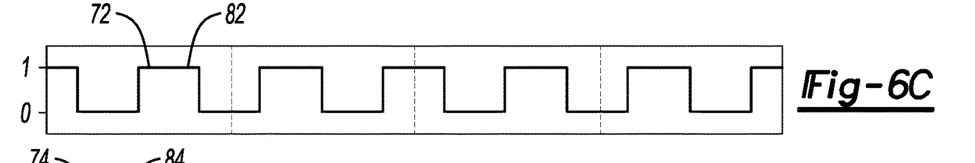
Figure 6D:
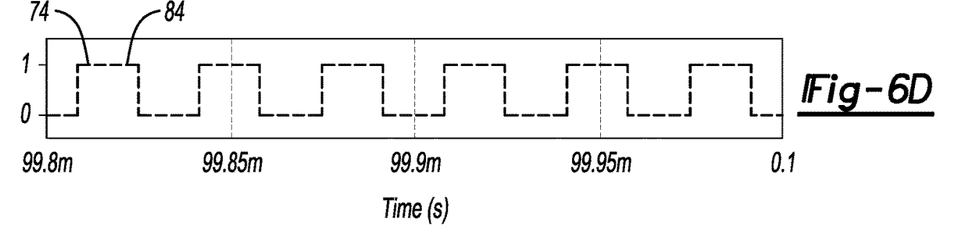
Figure 7A:
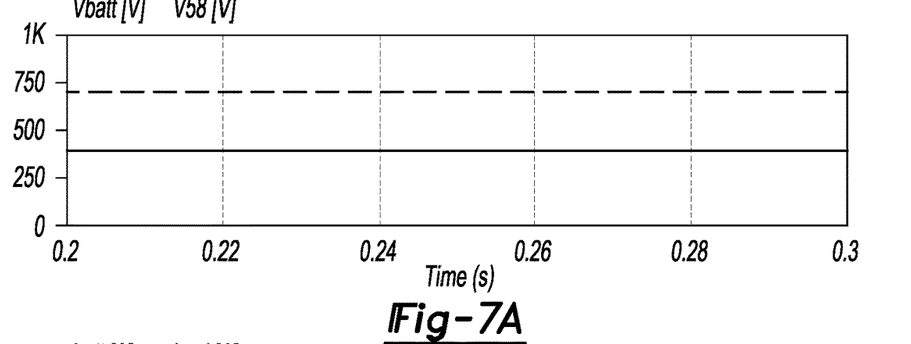
FIGS. 7A-7H show simulation results of a proposed topology in battery charging mode.
Figure 7B:
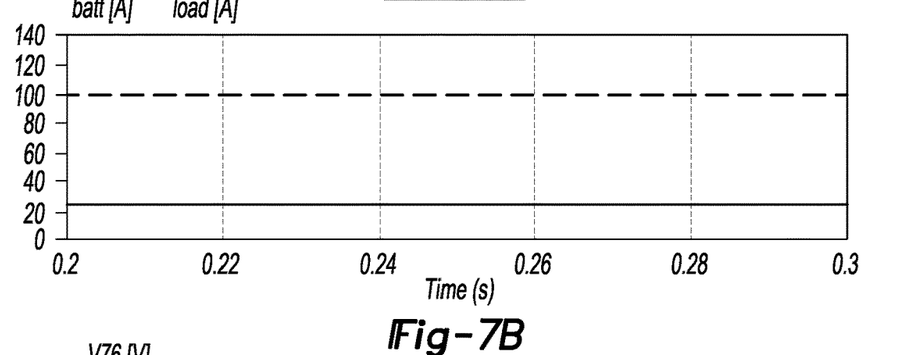
Figure 7C:
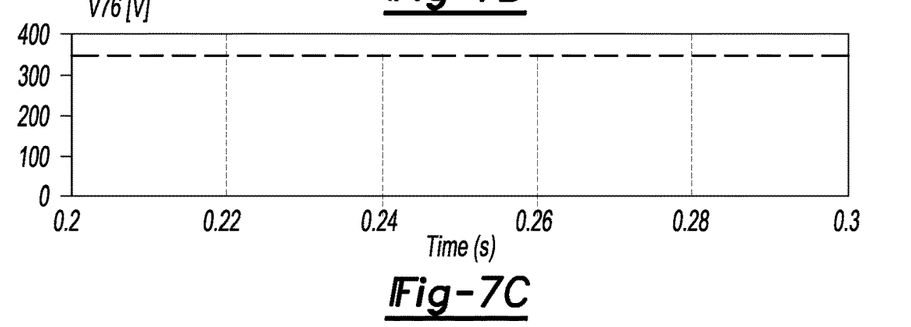
Figure 7D:
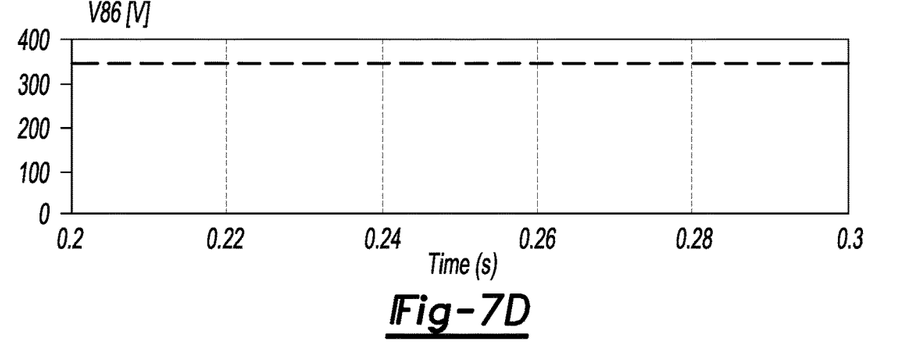
Figure 7E:
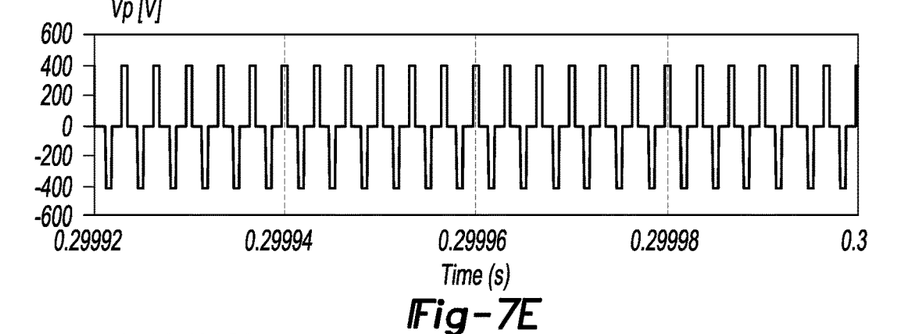
Figure 7F:
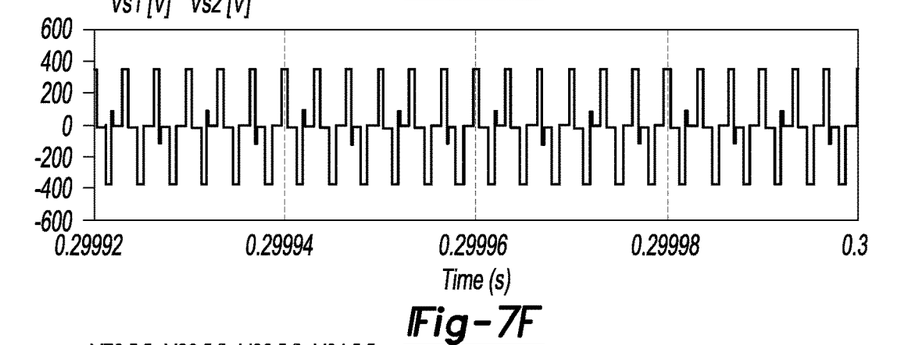
Figure 7G:
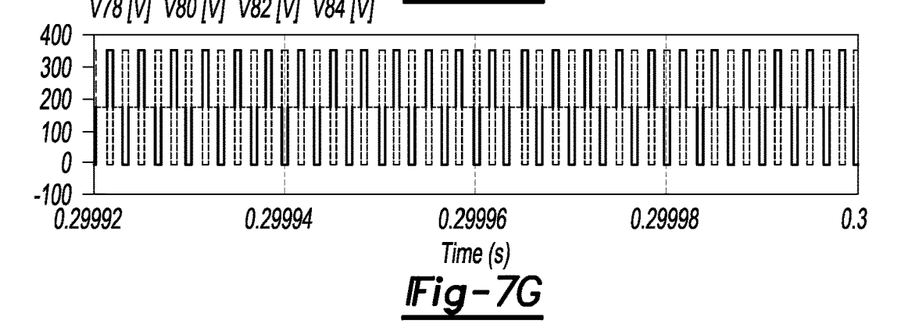
Figure 7H:
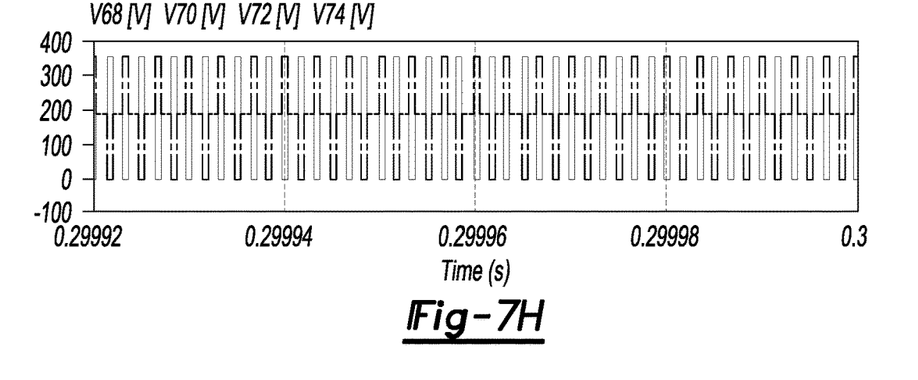
Figure 8A:
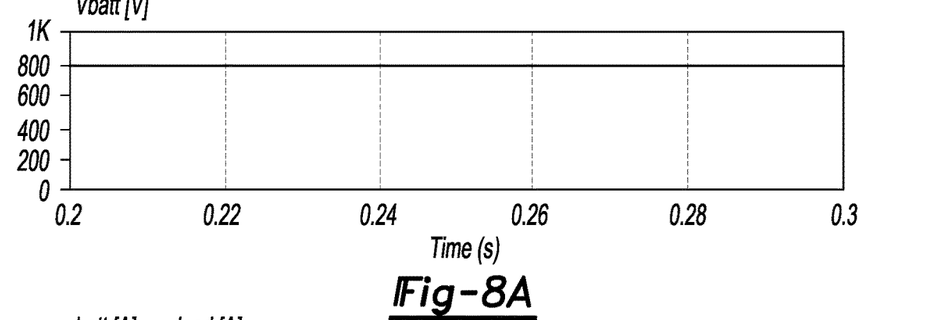
FIGS. 8A-8H show simulation results of a proposed topology in vehicle driving mode.
Figure 8B:
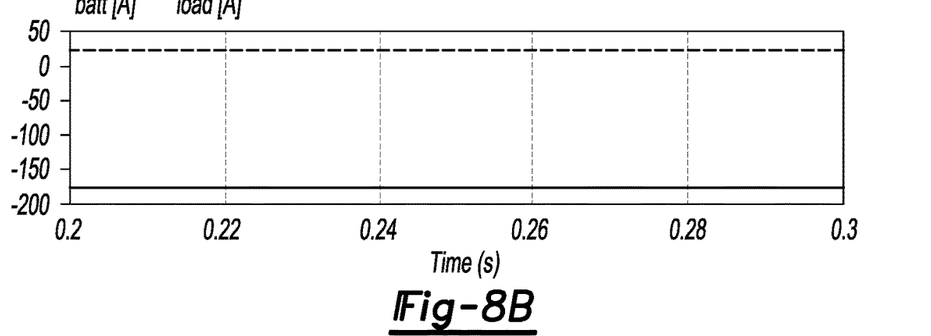
Figure 8C:
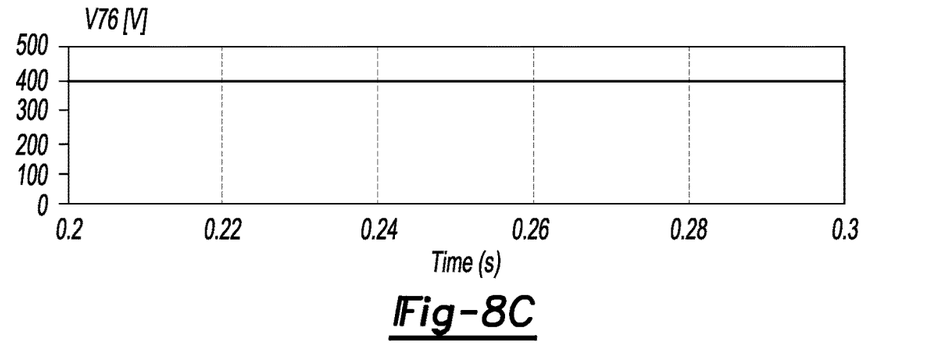
Figure 8D:
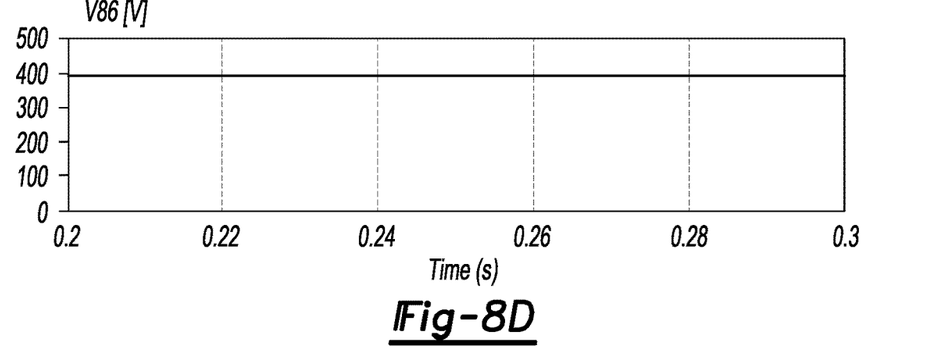
Figure 8E:
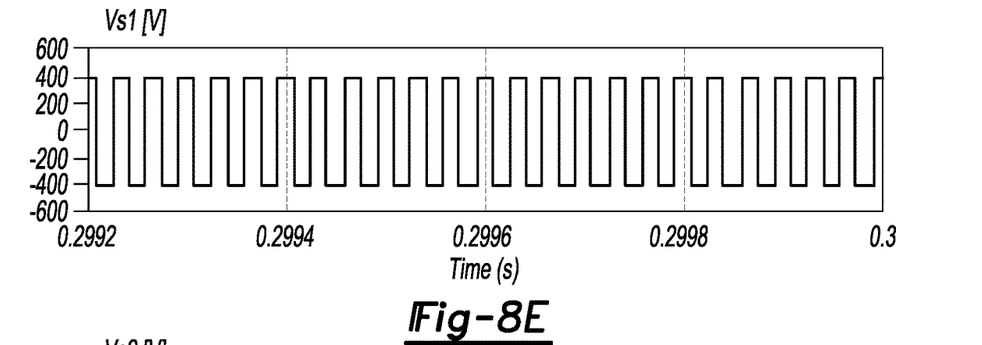
Figure 8F:
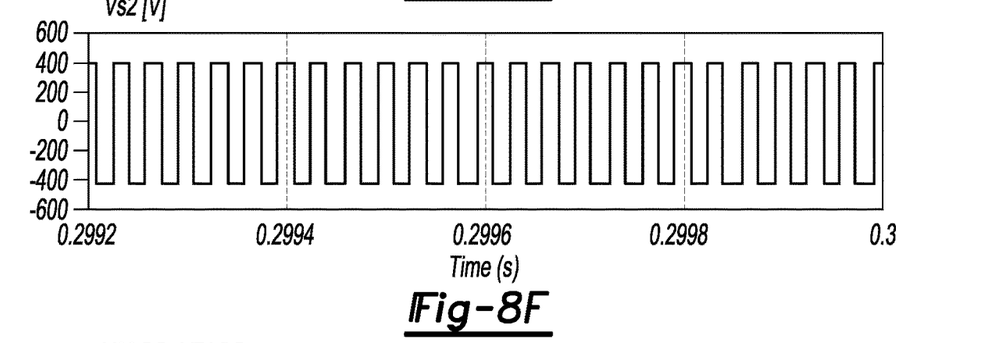
Figure 8G:
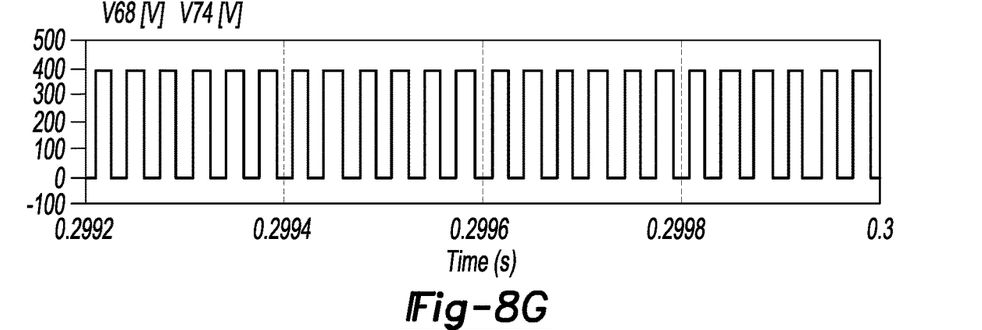
Figure 8H:
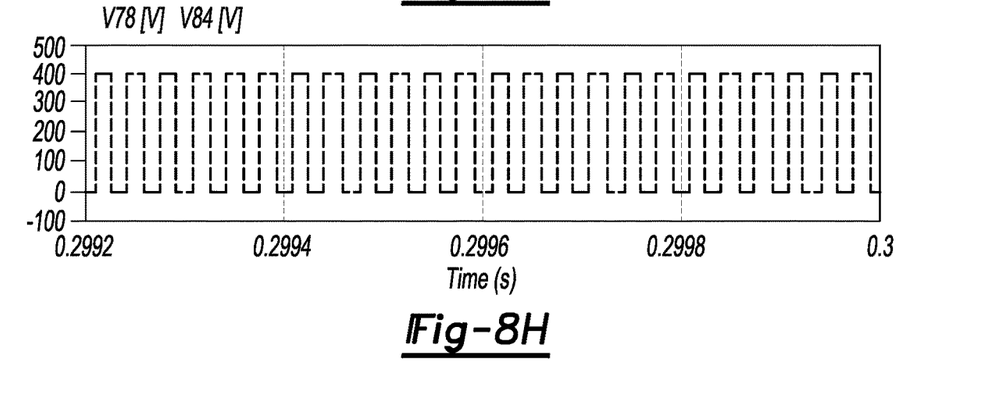
Figure 9A:
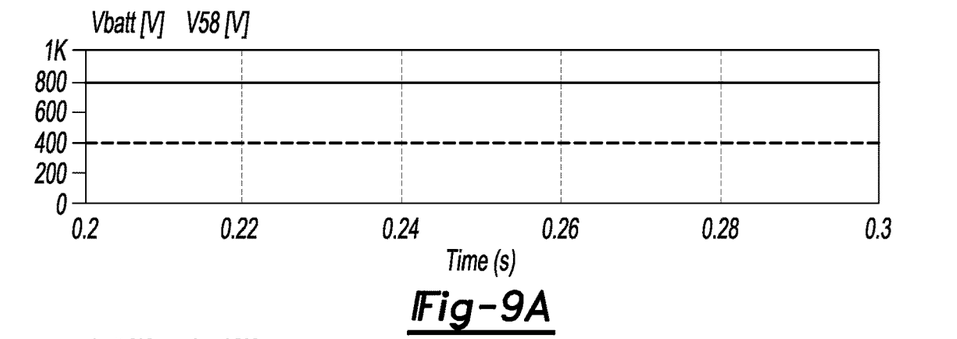
FIGS. 9A-9H show simulation results of a proposed topology in vehicle to grid or on-board generator mode.
Figure 9B:
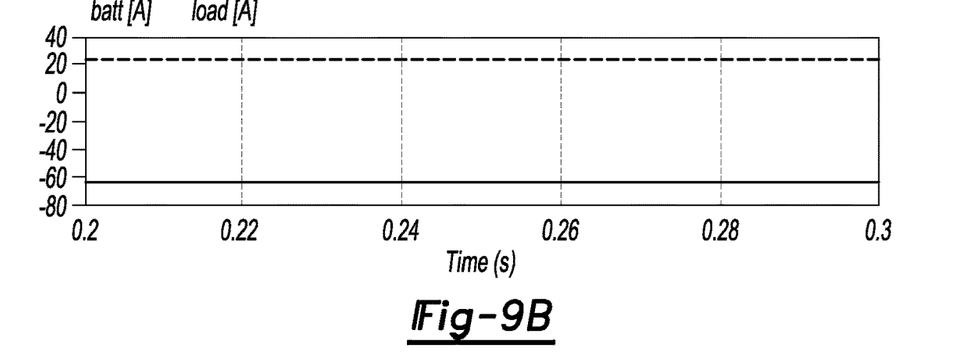
Figure 9C:
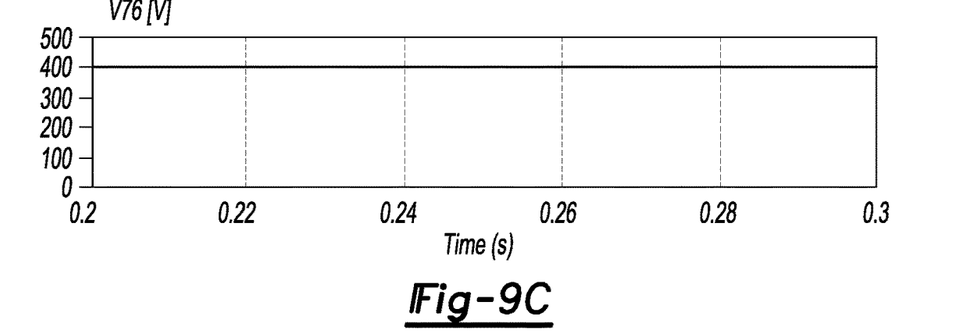
Figure 9D:
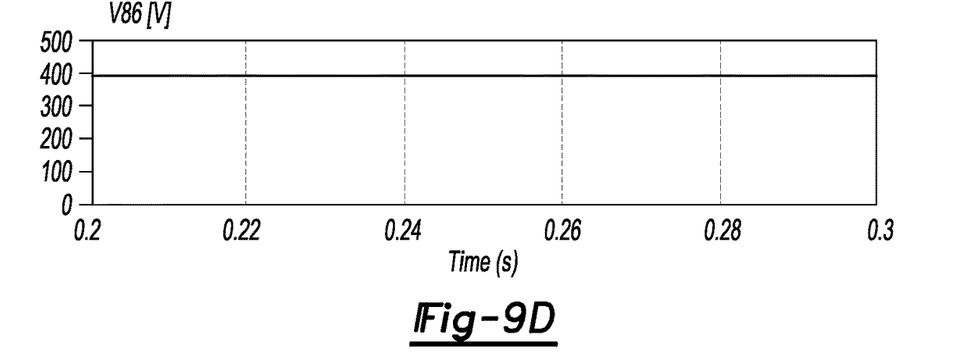
Figure 9E:
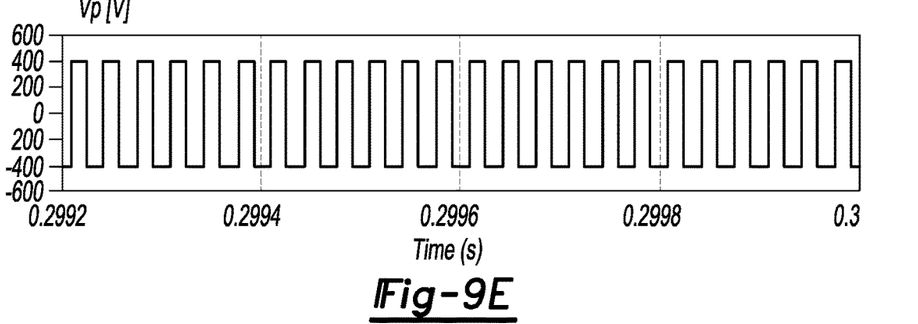
Figure 9F:
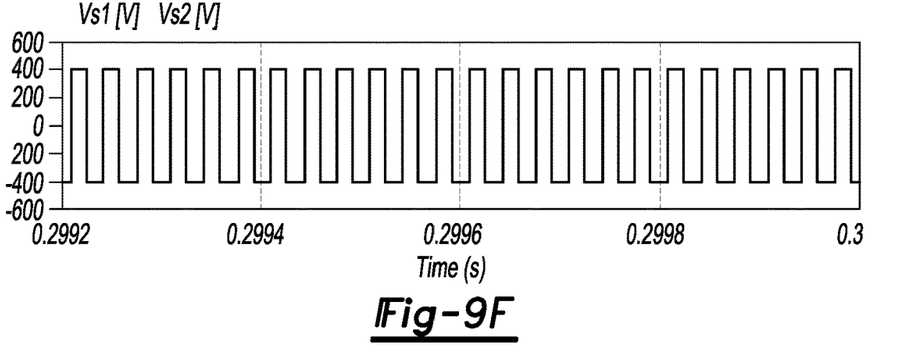
Figure 9G:
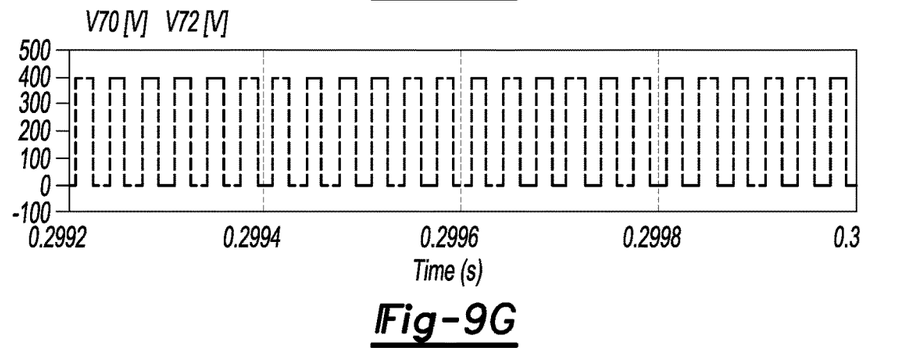
Figure 9H:
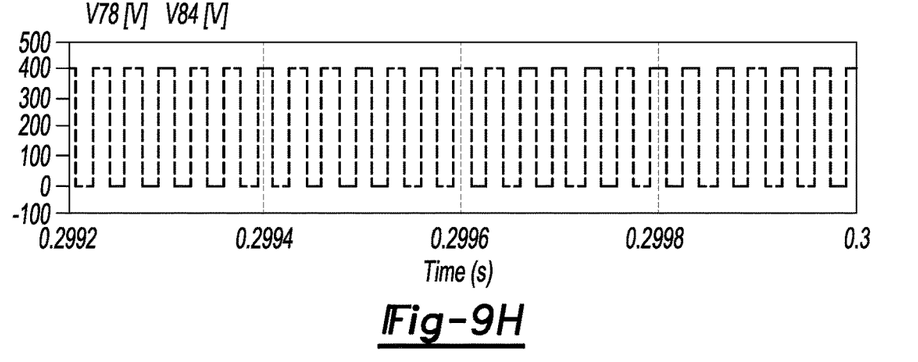

FIG. 4 proposes a control method for the high voltage (e.g., 800V) battery power system shown in FIGS. 2 and 3. It is straight forward to operate because there is only one closed-loop control for battery charging mode, and two open-loop controls with 50% duty cycle for vehicle driving mode as shown in FIGS. 5A-5D and vehicle to grid/on-board generator mode as shown in FIGS. 6A-6D. The control method includes a summation operation 100 for a reference current Iref and battery current Ibatt, a proportional-integral operation 102, a pulse width modulation operation 104, and logical NOT blocks 106, 108.

Operational Modes

Battery Charging Mode—In this mode, the rectifier 46 transfers power from the grid 88 to the traction battery 40. The motor drives 42 are OFF, but the vehicle electronic loads 44 may consume energy. Referring again to FIG. 4, the battery current is controlled during the charging process and the voltage balance of the capacitors 76, 86 is maintained. In this mode, the switches 68-74 and 78-84 (FIG. 2) (68'-74' (FIG. 3)) are OFF and the H-bridge of the switches 50-56 works as an inverter to output 3-level high frequency pulse voltage by setting the phase shift between the two phase-legs (50, 52 and 54, 56), where each phase leg outputs a voltage pulse of 50% duty cycle. The phase shift angle ϕ is derived from the battery current closed-loop control, as shown in FIG. 4.

Vehicle Driving Mode—In this mode, the motor drives 42 work to drive the vehicle 30. The inverter/rectifier 46 does not operate and the switches 50-56 and 78-84 are OFF. The switches 68-74 are controlled with 50% duty cycle as shown in FIGS. 5A-5D to maintain the same voltage for the capacitors 76, 86. There is energy transfer between the motor drives 42 (consuming energy during motoring mode, generating energy during generating mode) and traction battery 40. Also, the vehicle loads 44 consume energy from the traction battery 40.

Vehicle to Grid or On-Board Generating Mode—In this mode, the inverter 46 works as an on-board generator or a vehicle to grid facilitator (i.e., vehicle to grid, the traction battery 40 transfers power to the grid 88). The traction battery 40 provides power to the grid 88 or plug 90. The switches 68-74 and 78-84 are controlled at 50% duty cycle as shown in FIGS. 6A-6D to transfer power from the traction battery 40 to the capacitor 58 and maintain balance voltage between the capacitors 76, 86. For this mode, the switches 50-56 are OFF. The inverter 46' in FIG. 3 can also work as an on-board generator or vehicle to grid facilitator if the power of the vehicle to grid or on-board generator operation is not greater than the power of the vehicle loads 44'. To achieve this operation, the switches 68'-74' are controlled at 50% duty cycle as shown in FIGS. 6A-6D to transfer power from the traction battery 40' to the capacitor 58' and maintain balance voltage between the capacitors 76', 86'. For this mode, the switches 50'-56' are OFF.

The topologies and control strategies herein may offer several benefits. Certain arrangements provide an 800V traction battery power system that integrates the functions of an on-board charger, on-board generator, and vehicle to grid facilitator, supplies power to vehicle loads, and achieves an interface between an 800V traction battery and 400V power systems.

A straight forward control method is proposed to operate the integrated traction battery power system. There is only one closed-loop control for battery charging mode, as shown in FIG. 4, and two open-loop controls with 50% duty cycle for vehicle driving mode and vehicle to grid/on-board generating modes, as shown in FIGS. 5A-5D and 6A-6D, respectively, which may improve reliability.

For the 800V/400V arrangements, existing 400V hardware designs for on-board chargers, on-board generators, auxiliary power modules, and other electronic loads can be used. Additionally, 600V MOSFETs can be used to achieve the 800V traction battery power system, which eases the burden in selection of components, improves efficiency, and lowers expense. Use of a single high frequency isolated transformer, as opposed to two, to achieve on-board charging and on-board generating functionalities reduces expense, losses, and required packaging space.

FIGS. 7A-7H show simulation results to verify the proposed system in battery charging mode. In simulation, the switching frequency is 30 kHz, the turns ratio of the transformer 38 is 1:1:1, the voltage of the traction battery 40 is 700V, and the vehicle loads 44 have a 25 A current (8.75 kW). The rectifier 46 is controlled to maintain voltage of the capacitor 58 at 400V. In the closed-loop control shown in FIG. 4, battery charging current is set to 100 A.

The traction battery charging current is 100 A (70 kW), the capacitor 86 provides a 25 A current to the vehicle electronic loads 44. The capacitors 76, 86 have the same voltage of 350V. The switches 50-56 show 400V voltage stress and the switches 68-74 and 78-84 have 350V voltage stress.

FIGS. 8A-8H show simulation results to verify the proposed system in vehicle driving mode. In simulation, the switching frequency is 30 kHz, the turns ratio of the transformer 38 is 1:1:1, the voltage of the traction battery 40 is 800V, and the vehicle loads 44 have a 25 A current (10 kW). The inverter/rectifier 46 does not operate in this mode. The motor drives 42 consume a 160 A current (128 kW).

The traction battery 40 has a discharge current of 172.5 A (138 kW) for the motor drives 42 and vehicle loads 44. Even though the capacitor 86 provides a 25 A current to the vehicle electronic loads 44, the capacitors 76, 86 have the same voltage of 400V under the voltage balance control shown in FIGS. 5A-5D. The voltage stresses on the devices are also shown.

FIGS. 9A-9H show simulation results to verify the proposed system in vehicle to grid or on-board generating mode. In simulation, the switching frequency is 30 kHz, the turns ratio of the transformer 38 is 1:1:1, the voltage of the traction battery 40 is 800V, and the vehicle loads have a 25 A current (10 kW). The inverter 46 operates in these modes. The motor drives 42 do not work. 39.8 kW of power is output from the inverter 46.

The voltage of the capacitor 58 is controlled to 400V. The traction battery 40 has a discharge current of 62.4 A for the vehicle loads 44 and vehicle to grid or on-board generating operation. Even though the capacitor 86 provides a 25 A current to the vehicle electronic loads 44, the capacitors 76, 86 have the same voltage of 400V under the voltage balance control. The voltage stresses are also shown.

The algorithms, methods, or processes disclosed herein can be deliverable to or implemented by a computer, controller, or processing device, which can include any dedicated electronic control unit or programmable electronic control unit. Similarly, the algorithms, methods, or processes can be stored as data and instructions executable by a computer or controller in many forms including, but not limited to, information permanently stored on non-writable storage media such as read only memory devices and information alterably stored on writeable storage media such as compact discs, random access memory devices, or other magnetic and optical media. The algorithms, methods, or processes can also be implemented in software executable objects. Alternatively, the algorithms, methods, or processes can be embodied in whole or in part using suitable hardware components, such as application specific integrated circuits, field-programmable gate arrays, state machines, or other hardware components or devices, or a combination of firmware, hardware, and software components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. The words processor and processors may be interchanged herein, as may the words controller and controllers.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle power system comprising:
a DC to AC converter;
a pair of AC to DC converters;
a transformer including a core, a primary winding wound about the core and electrically connected to an output of the DC to AC converter, and a pair of secondary windings wound about the core, each of the secondary windings being electrically connected to an input of one of the AC to DC converters; and
a controller programmed to operate in a charge mode such that a magnitude of voltage at an input of the DC to AC converter is half of a magnitude of voltage at a collective output of the AC to DC converters to transfer power from the input of the DC to AC converter to the collective output.

2. The system of claim 1 further comprising a traction battery electrically connected to the collective output, wherein the controller is further programmed to operate in the charge mode such that switches of the DC to AC converter activate with a duty cycle and switches of the AC to DC converters remain off to transfer power from the input of the DC to AC converter to the traction battery.

3. The system of claim 2 further comprising a motor drive electrically connected to the collective output such that the traction battery is electrically between the collective output and the motor drive, wherein the controller is further programmed to operate in a drive mode such that switches of one of the AC to DC converters activate with a duty cycle, and switches of the other of the AC to DC converters and DC to AC converter are off to transfer power from the traction battery to the motor drive or vehicle loads.

4. The system of claim 1, wherein the controller is further programmed to operate in a grid power/on-board generator mode such that switches of at least one of the AC to DC converters activate with a duty cycle and switches of the DC to AC converter remain off to transfer power from the traction battery to the input of the DC to AC converter.

5. The system of claim 1, wherein at least one of the AC to DC converters includes a plurality of switches.

6. The system of claim 1, wherein at least one of the AC to DC converters includes a plurality of diodes.

7. The system of claim 1 further comprising a pair of series connected capacitors electrically connected across the collective output having voltages that are balanced.

8. The system of claim 7, wherein one of the capacitors is electrically connected to an output of one of the AC to DC converters and the other of the capacitors is electrically connected to an output of the other of the AC to DC converters.

9. A vehicle comprising:
a DC to AC converter;
a pair of AC to DC converters;
a transformer including a core, a primary winding wound about the core and electrically connected to an output of the DC to AC converter, and a pair of secondary windings wound about the core, each of the secondary windings being electrically connected to an input of one of the AC to DC converters;
a traction battery electrically connected to a collective output of the AC to DC converters;
a motor drive electrically connected to the collective output such that the traction battery is electrically between the collective output and the motor drive; and
a controller programmed to operate in a drive mode such that switches of one of the AC to DC converters activate with a duty cycle, and switches of the other of the AC to DC converters and DC to AC converter are off to transfer power from the traction battery to the motor drive or vehicle loads.

10. The vehicle of claim 9, wherein the controller is further programmed to operate in a grid power/on-board generator mode such that switches of at least one of the AC to DC converters activate with a duty cycle and switches of the DC to AC converter remain off to transfer power from the traction battery to the input of the DC to AC converter.

11. The vehicle of claim 9, wherein the controller is further programmed to operate in a charge mode such that switches of the DC to AC converter activate with a duty cycle and switches of the DC to AC converters remain off to transfer power from the input of the DC to AC converter to the traction battery.

12. The vehicle of claim 9, wherein at least one of the AC to DC converters includes a plurality of switches.

13. The vehicle of claim 9, wherein at least one of the AC to DC converters includes a plurality of diodes.

14. The vehicle of claim 9 further comprising a pair of series connected capacitors electrically connected across the collective output having voltages that are balanced.

15. The vehicle of claim 14, wherein one of the capacitors is electrically connected to an output of one of the AC to DC converters and the other of the capacitors is electrically connected to an output of the other of the AC to DC converters.

16. A vehicle power system comprising:
a DC to AC converter;
a pair of AC to DC converters;
a transformer including a core, a primary winding wound about the core and electrically connected to an output of the DC to AC converter, and a pair of secondary windings wound about the core, each of the secondary windings is electrically connected to an input of one of the AC to DC converters;
a traction battery electrically connected to a collective output of the AC to DC converters; and
a controller programmed to operate in a grid power/on-board generator mode such that switches of at least one of the AC to DC converters activate with a duty cycle and switches of the DC to AC converter remain off to transfer power from the traction battery to the input of the DC to AC converter.

17. The system of claim 16 further comprising a motor drive electrically connected to the collective output such that the traction battery is electrically between the collective output and the motor drive, wherein the controller is further programmed to operate in a drive mode such that switches of one of the AC to DC converters activate with a duty cycle, and switches of the other of the AC to DC converters and DC to AC converter are off to transfer power from the traction battery to the motor drive or vehicle loads.

18. The system of claim 16, wherein the controller is further programmed to operate in a charge mode such that switches of the DC to AC converter activate with a duty cycle and switches of the DC to AC converters remain off to transfer power from the input of the DC to AC converter to the traction battery.

19. The system of claim 16, wherein at least one of the AC to DC converters includes a plurality of switches.

20. The system of claim 16, wherein at least one of the AC to DC converters includes a plurality of diodes.

* * * * *